US012634201B2

(12) United States Patent
Triplet et al.

(10) Patent No.: US 12,634,201 B2
(45) Date of Patent: May 19, 2026

(54) DETECTING SITE LOCATIONS OF UNKNOWN NETWORK DEVICES

(71) Applicant: Ciena Corporation, Hanover, MD (US)

(72) Inventors: Thomas Triplet, Manotick (CA);
Mahesh Kumar Gupta, Navi Mumbai
(IN); Sudhan Puranik, Pune (IN);
Yogeshwar Chatur Deore, Pune (IN);
Myriam Fares He Younan, Stittsville
(CA); Arslan Shahid, Stittsville (CA);
Saurabh Dinesh Brahmankar, Pune
(IN)

(73) Assignee: Ciena Corporation, Hanover, MD (US)

( * ) Notice: Subject to any disclaimer, the term of this
patent is extended or adjusted under 35
U.S.C. 154(b) by 178 days.

(21) Appl. No.: 17/370,070

(22) Filed: Jul. 8, 2021

(65) Prior Publication Data

US 2022/0385539 A1    Dec. 1, 2022

(30) Foreign Application Priority Data

May 25, 2021    (IN) .............................. 202111023214

(51) Int. Cl.
H04L 41/12        (2022.01)
G06F 18/214       (2023.01)
G06F 18/23213     (2023.01)
G06N 20/00        (2019.01)
H04L 41/16        (2022.01)
(Continued)

(52) U.S. Cl.
CPC .......... H04L 41/12 (2013.01); G06F 18/2148
(2023.01); G06F 18/23213 (2023.01); G06N

20/00 (2019.01); H04L 41/16 (2013.01);
H04L 43/067 (2013.01); H04L 43/0852
(2013.01)

(58) Field of Classification Search
CPC ......... H04L 41/12; H04L 41/16; G06N 20/00;
G06K 9/6223; G06K 9/6257
See application file for complete search history.

(56) References Cited

U.S. PATENT DOCUMENTS

| | | | |
|---|---|---|---|
| 6,947,978 B2 * | 9/2005 | Huffman ................. | H04L 41/12 |
| | | | 709/219 |
| 7,808,958 B1 * | 10/2010 | Hernacki ............ | H04W 12/122 |
| | | | 370/252 |
| 10,171,161 B1 | 1/2019 | Côté et al. | |

(Continued)

OTHER PUBLICATIONS

Terry-Jack, Mohammed, "Unsupervised Learning to aid Labelling
for Supervised Learning", 2019, medium.com, accessed at https://
medium.com/@b.terryjack/unsupervised-learning-to-aid-labelling-
for-supervised-learning-253fe2d8e06b (Year: 2019).*

*Primary Examiner* — Nicholas P Celani
(74) *Attorney, Agent, or Firm* — Baratta Law PLLC;
Lawrence A. Baratta, Jr.

(57) ABSTRACT

Systems and methods for predicting the location of unknown
network devices within a particular site of a multi-site
network are provided. A method, according to one imple-
mentation, includes obtaining transmission characteristics
related to any of packets and frames transmitted between an
unknown network device and a plurality of beacon devices.
Each beacon device is a network device associated with a
fixed site location within a multi-site network. The method
also includes utilizing the transmission characteristics to
predict a site within the multi-site network where the
unknown network device is located.

19 Claims, 8 Drawing Sheets

(51) Int. Cl.
    *H04L 43/067*      (2022.01)
    *H04L 43/0852*    (2022.01)

(56)            References Cited

U.S. PATENT DOCUMENTS

| | | | |
|---|---|---|---|
| 10,841,181 | B2 | 11/2020 | Côté et al. |
| 10,965,527 | B2 | 3/2021 | Triplet et al. |
| 2003/0217122 | A1* | 11/2003 | Roese .................... H04L 67/04 709/219 |
| 2009/0119394 | A1* | 5/2009 | Winkler ................. H04L 41/12 709/223 |
| 2016/0337426 | A1* | 11/2016 | Shribman ............. H04L 65/612 |
| 2017/0251068 | A1* | 8/2017 | Kappler .................. H04L 69/16 |
| 2018/0248905 | A1 | 8/2018 | Côté et al. |
| 2019/0138948 | A1 | 5/2019 | Janulewicz et al. |
| 2019/0280942 | A1 | 9/2019 | Côté et al. |
| 2019/0303726 | A1 | 10/2019 | Côté et al. |
| 2020/0082013 | A1 | 3/2020 | Triplet et al. |
| 2020/0210854 | A1* | 7/2020 | Srinivasan ............. G06N 20/00 |
| 2020/0259700 | A1 | 8/2020 | Bhalla et al. |
| 2020/0259717 | A1 | 8/2020 | Ong et al. |
| 2021/0028973 | A1 | 1/2021 | Côté et al. |
| 2021/0099378 | A1 | 4/2021 | Alaettinoglu et al. |
| 2022/0099855 | A1* | 3/2022 | Li ......................... G01V 1/345 |

\* cited by examiner

SITE B

SITE A

SITE D

SITE C

MEMORY DEVICE   24

INVENTORY
LOCATOR
ENGINE   34

PROCESSING
DEVICE   22

32

INPUT/OUTPUT
INTERFACES   26

NETWORK
INTERFACE   28

DATABASE   30

NETWORK   10

20

| | Quebec City | Mumbai | Buenos Aires | Sydney | Friedrichshafen | Milpitas | San Jose | Denver | Austin | Montreal | Pune | Ottawa |
|---|---|---|---|---|---|---|---|---|---|---|---|---|
| Quebec City | 0.44 | 0 | 0 | 0 | 0 | 0 | 0.04 | 0.04 | 0 | 0.28 | 0 | 0.20 |
| Mumbai | 0 | 0.55 | 0 | 0 | 0 | 0 | 0 | 0 | 0 | 0 | 0.45 | 0 |
| Buenos Aires | 0 | 0 | 1.00 | 0 | 0 | 0 | 0 | 0 | 0 | 0 | 0 | 0 |
| Sydney | 0 | 0 | 0 | 1.00 | 0 | 0 | 0 | 0 | 0 | 0 | 0 | 0 |
| Friedrichshafen | 0 | 0.037 | 0 | 0 | 0.96 | 0 | 0 | 0 | 0 | 0 | 0 | 0 |
| Milpitas | 0 | 0 | 0 | 0 | 0 | 0.96 | 0.042 | 0 | 0 | 0 | 0 | 0 |
| San Jose | 0 | 0 | 0 | 0 | 0 | 0.11 | 0.82 | 0.018 | 0.053 | 0 | 0 | 0 |
| Denver | 0 | 0 | 0 | 0 | 0 | 0 | 0 | 0.71 | 0.12 | 0.042 | 0 | 0.12 |
| Austin | 0 | 0 | 0 | 0 | 0 | 0 | 0 | 0.22 | 0.78 | 0 | 0 | 0 |
| Montreal | 0.27 | 0 | 0 | 0 | 0 | 0 | 0 | 0.038 | 0.038 | 0.42 | 0 | 0.23 |
| Pune | 0 | 0.43 | 0 | 0.033 | 0 | 0 | 0 | 0 | 0 | 0 | 0.53 | 0 |
| Ottawa | 0.26 | 0 | 0 | 0 | 0 | 0 | 0.065 | 0.032 | 0.032 | 0.23 | 0 | 0.39 |

60

| LABEL | .100 .20.4 | .100 .20.5 | .127 .3.4 | .133 .0.1 | .138.3 .251 | .138 .3.3 | .139 .0.1 | .139 .3.11 | .144 .3.11 | .144 .3.3 | .150 .0.1 | .158 .0.1 | .168 .3.11 | .168 .3.3 | .176 .3.20 | .32.3 .10 | .32.3 .20 | .68.3 .11 | .68.3 .3 |
|---|---|---|---|---|---|---|---|---|---|---|---|---|---|---|---|---|---|---|---|
| Milpitas | 0.245 | 2.547 | 287.729 | 82.584 | 182.454 | 184.393 | 300.35 | 299.212 | 239.986 | 239.315 | 281.208 | 72 | 120.301 | 121.044 | 79.567 | 9.578 | 11.463 | 130.379 | 125.791 |
| Milpitas | 2.092 | 0.245 | 282.301 | 79.158 | 177.7 | 178.752 | 297.277 | 297.129 | 234.492 | 234.26 | 275.009 | 71 | 118.994 | 119.565 | 78.9 | 9.788 | 11.535 | 125.723 | 125.28 |
| Pune | 281.67 | 280.626 | 0.27 | 214.192 | 127.196 | 131.159 | 179.052 | 176.956 | 335.279 | 342.502 | 11.894 | 210.577 | 231.547 | 233.442 | 207.615 | 239.952 | 240.86 | 239.355 | 239.03 |
| Montreal | 80.247 | 80.698 | 221.466 | 0.228 | 112.323 | 111.877 | 227.897 | 226.163 | 168.769 | 166.797 | 200.246 | 8.334 | 51.107 | 51.545 | 7.638 | 71.04 | 72.336 | 58.266 | 57.514 |
| Friedrichshafen | 178.047 | 177.553 | 129.324 | 108.116 | 1.726 | 0.152 | 298.505 | 296.764 | 231.348 | 235.617 | 125.732 | 108.873 | 130.518 | 132.158 | 107.139 | 157.502 | 157.89 | 137.142 | 137.599 |
| Sydney | 298.138 | 297.964 | 178.71 | 228.456 | 296.941 | 298.8 | 0.273 | 1.648 | 349.581 | 306.465 | 181.818 | 231.567 | 191.668 | 192.659 | 226.266 | 171.673 | 172.951 | 198.935 | 200.624 |
| Buenos Aires | 234.946 | 233.901 | 345.2 | 168.66 | 230.857 | 232.331 | 307.521 | 305.089 | 3.365 | 0.26 | 331.252 | 171.295 | 169.699 | 174.337 | 163.153 | 174.335 | 175.931 | 178.353 | 180.091 |
| Mumbai | 278.437 | 275.449 | 13.305 | 202.021 | 124.705 | 127.151 | 181.764 | 178.663 | 337.802 | 332.652 | 0.279 | 205.919 | 235.545 | 229.352 | 207.497 | 239.431 | 240.267 | 238.294 | 236.51 |
| Quebec City | 71 | 70 | 217.462 | 7.92 | 107.039 | 127.151 | 232.231 | 229.696 | 170.577 | 172.361 | 204.772 | 0.215 | 50.474 | 53.977 | 11.449 | 75.858 | 76.496 | 56.246 | 59.397 |
| Denver | 120.545 | 120.698 | 233.629 | 52.699 | 130.986 | 109.587 | 191.742 | 189.592 | 169.214 | 171.649 | 229.321 | 53.366 | 1.531 | 0.186 | 49.029 | 34.721 | 35.89 | 29.233 | 31.919 |
| Ottawa | 81.634 | 80.589 | 209.039 | 7.541 | 106.823 | 133.858 | 227.276 | 224.829 | 163.015 | 165.911 | 206.31 | 12.333 | 48.532 | 52.88 | 0.251 | 68.573 | 69.724 | 55.492 | 55.873 |
| San Jose | 9.578 | 9.788 | 239.923 | 71.214 | 155.783 | 109.487 | 171.941 | 169.569 | 173.537 | 174.817 | 238.752 | 75.13 | 33.047 | 34.751 | 68.179 | 0.186 | 1.311 | 45.41 | 46.915 |
| San Jose | 11.463 | 11.535 | 241.904 | 72.578 | 156.899 | 159.384 | 173.239 | 171.014 | 174.682 | 176.682 | 241.093 | 76.776 | 34.715 | 35.723 | 70.593 | 1.276 | 0.247 | 46.846 | 48.328 |
| Austin | 127.058 | 130.615 | 239.659 | 62.243 | 136.213 | 138.303 | 201.061 | 198.224 | 178.553 | 181.243 | 237.292 | 63.511 | 29.118 | 34.385 | 56.55 | 47.52 | 49.372 | 1.843 | 0.191 |

70

Figures 6, 7:
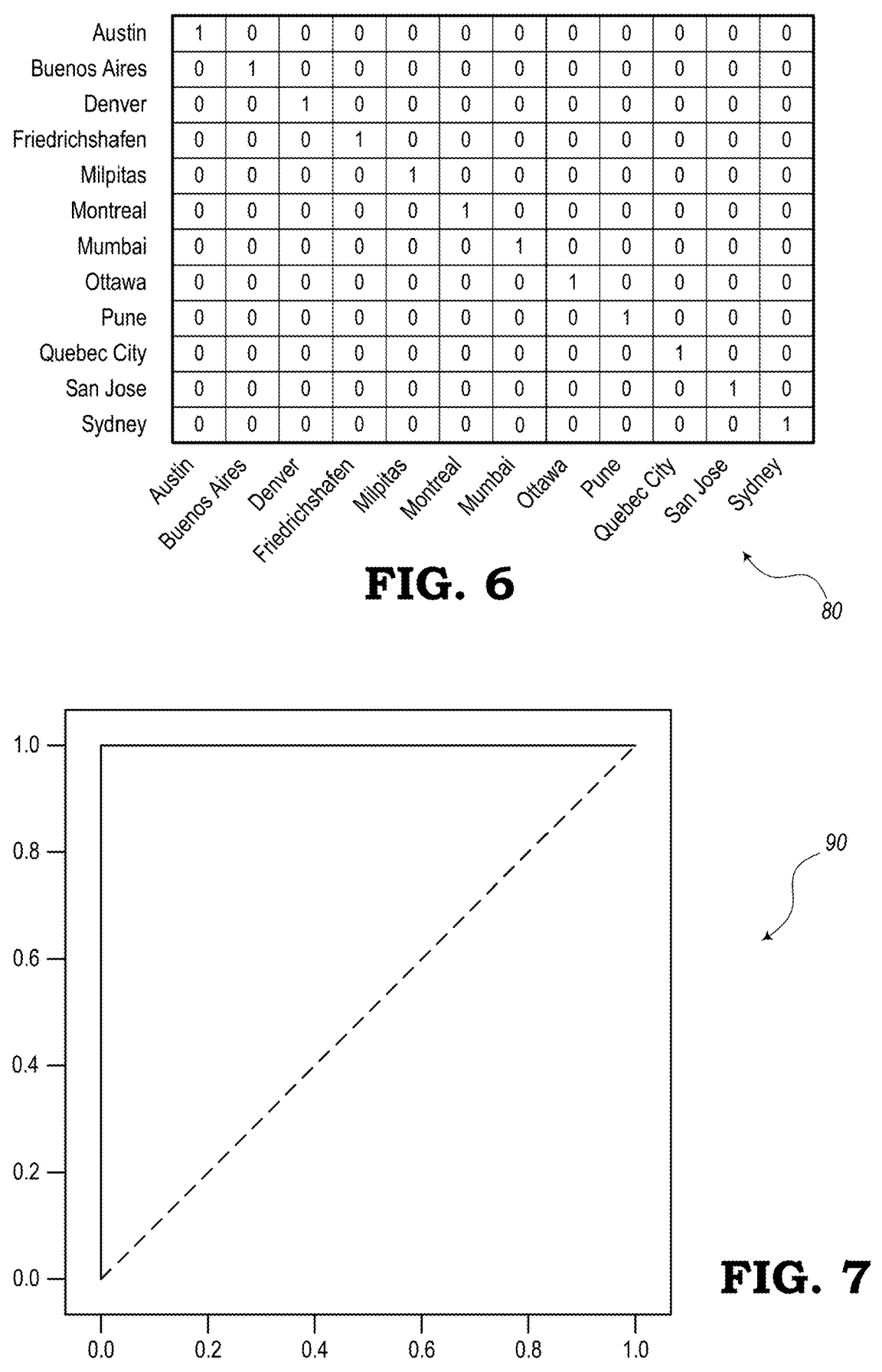

| | Austin | Buenos Aires | Denver | Friedrichshafen | Milpitas | Montreal | Mumbai | Ottawa | Pune | Quebec City | San Jose | Sydney |
|---|---|---|---|---|---|---|---|---|---|---|---|---|
| Austin | 1 | 0 | 0 | 0 | 0 | 0 | 0 | 0 | 0 | 0 | 0 | 0 |
| Buenos Aires | 0 | 1 | 0 | 0 | 0 | 0 | 0 | 0 | 0 | 0 | 0 | 0 |
| Denver | 0 | 0 | 1 | 0 | 0 | 0 | 0 | 0 | 0 | 0 | 0 | 0 |
| Friedrichshafen | 0 | 0 | 0 | 1 | 0 | 0 | 0 | 0 | 0 | 0 | 0 | 0 |
| Milpitas | 0 | 0 | 0 | 0 | 1 | 0 | 0 | 0 | 0 | 0 | 0 | 0 |
| Montreal | 0 | 0 | 0 | 0 | 0 | 1 | 0 | 0 | 0 | 0 | 0 | 0 |
| Mumbai | 0 | 0 | 0 | 0 | 0 | 0 | 1 | 0 | 0 | 0 | 0 | 0 |
| Ottawa | 0 | 0 | 0 | 0 | 0 | 0 | 0 | 1 | 0 | 0 | 0 | 0 |
| Pune | 0 | 0 | 0 | 0 | 0 | 0 | 0 | 0 | 1 | 0 | 0 | 0 |
| Quebec City | 0 | 0 | 0 | 0 | 0 | 0 | 0 | 0 | 0 | 1 | 0 | 0 |
| San Jose | 0 | 0 | 0 | 0 | 0 | 0 | 0 | 0 | 0 | 0 | 1 | 0 |
| Sydney | 0 | 0 | 0 | 0 | 0 | 0 | 0 | 0 | 0 | 0 | 0 | 1 |

|  | precision | recall | F1 score | support |
|---|---|---|---|---|
| Austin | 1.00 | 1.00 | 1.00 | 6 |
| Buenos Aires | 1.00 | 1.00 | 1.00 | 10 |
| Denver | 1.00 | 1.00 | 1.00 | 10 |
| Friedrichshafen | 1.00 | 1.00 | 1.00 | 11 |
| Milpitas | 1.00 | 1.00 | 1.00 | 16 |
| Montreal | 1.00 | 1.00 | 1.00 | 6 |
| Mumbai | 1.00 | 1.00 | 1.00 | 13 |
| Ottawa | 1.00 | 1.00 | 1.00 | 9 |
| Pune | 1.00 | 1.00 | 1.00 | 6 |
| Quebec City | 1.00 | 1.00 | 1.00 | 4 |
| San Jose | 1.00 | 1.00 | 1.00 | 13 |
| Sydney | 1.00 | 1.00 | 1.00 | 6 |
|  |  |  |  |  |
| accuracy |  |  | 1.00 | 110 |
| macro avg | 1.00 | 1.00 | 1.00 | 110 |
| weighted avg | 1.00 | 1.00 | 1.00 | 110 |

FIG. 10
DEVICES
DEVICES

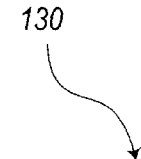

130

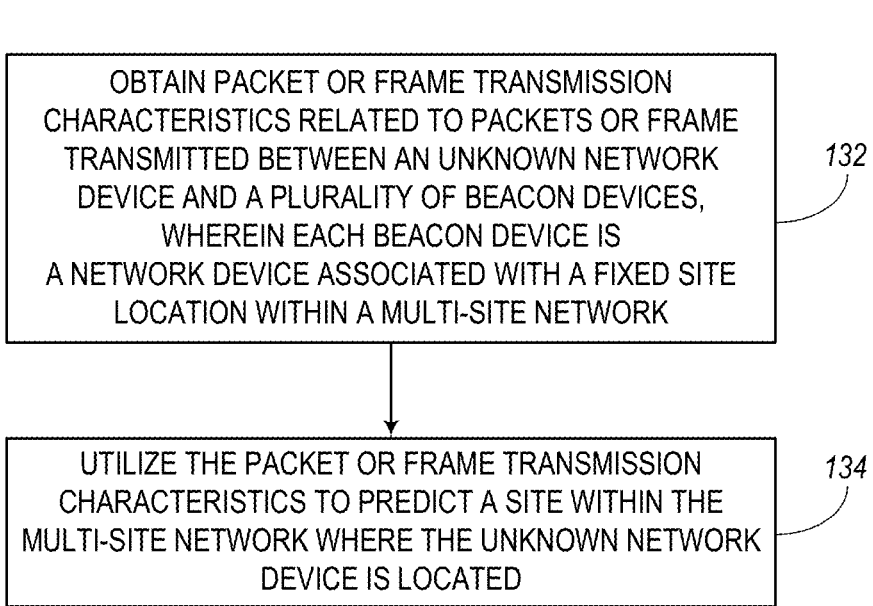

OBTAIN PACKET OR FRAME TRANSMISSION CHARACTERISTICS RELATED TO PACKETS OR FRAME TRANSMITTED BETWEEN AN UNKNOWN NETWORK DEVICE AND A PLURALITY OF BEACON DEVICES, WHEREIN EACH BEACON DEVICE IS A NETWORK DEVICE ASSOCIATED WITH A FIXED SITE LOCATION WITHIN A MULTI-SITE NETWORK

132

UTILIZE THE PACKET OR FRAME TRANSMISSION CHARACTERISTICS TO PREDICT A SITE WITHIN THE MULTI-SITE NETWORK WHERE THE UNKNOWN NETWORK DEVICE IS LOCATED

DETECTING SITE LOCATIONS OF UNKNOWN NETWORK DEVICES

TECHNICAL FIELD

The present disclosure generally relates to networking systems and methods. More particularly, the present disclosure relates to using unsupervised and supervised machine learning in an inventory system for detecting the site location of a number of network devices to be discovered within a multi-site network.

BACKGROUND

Many Fortune 1000 companies have communication networking systems that operate at multiple sites around the globe. Typically, each site may include a variety of network devices, such as firewalls, switches, routers, wireless controllers etc. These network devices may also be managed within an inventory system associated with the company. Maintaining and updating inventory systems is a task that usually involves identifying the physical location of the network devices. This inventory management task is typically performed manually and can be quite time-consuming for a network operator. Also, since the inventory can quickly become obsolete and unreliable, due to continuous changes to a network, the network operator may be forced to perform additional inventory updating work. Furthermore, device inventory management can also become a problem if the various sites are subject to different compliance rules.

Conventional inventory systems typically allow network operators to manually enter the geolocations (or sites) of the network devices. The manual efforts required by the network operators may include finding latitude and longitude coordinates of each of the network device's location and the associated office (site) addresses. For example, determining these geo-location coordinates can be performed using Global Positioning System (GPS) receivers. Then, once these details of the respective geo-locations have been detected, this information must be manually fed into the corresponding Inventory Management System (IMS). A number of inventory management algorithms have been published, such as Hillman et al., "Modelling of IP Geolocation by use of latency measurements," https://arxiv.org/pdf/2004.07836.pdf, etc.

The conventional inventory systems include a number of shortcomings, as suggested above. For example, most conventional systems rely on human effort and may require time-consuming procedures. Much time and effort may be needed on the part of the network operator to manually obtain geo-location measurements and manually maintain an inventory database of geo-location mapping inventory of each of the respective devices.

By requiring a network operator to perform these manual tasks, the conventional systems thereby lack any suitable automation to ease the burden of the network operator. In the case of any type of changes to the network topology (e.g., the addition of one or more network devices, the removal of one or more network devices, the movement of one or more network devices to new locations (sites), etc.), the same mapping will be used and will not be automatically updated. Instead, it will be up to the network operator to learn about these changes and update of IMS accordingly. Of course, with any type of manual updates, data entry may be prone to human errors.

Another shortcoming of conventional systems is the accuracy of topology-aware algorithms used to perform geolocation detection. For example, some conventional systems can include geo-location inaccuracies up to about 500 km. Even the better performing systems may have an inaccuracy up to about 40 kms, which is often greater than the distance between the nearest two site locations in many networks. Thus, the conventional systems are insufficient for accurate IMSs. There is therefore a need in the art of inventory systems and IMS to be able to predict the general location of network devices in order to determine a site to which the network devices belong and to perform these predictive techniques in an automated manner to ease the burden on network operators.

BRIEF SUMMARY

The present disclosure describes systems, methods, and non-transitory computer-readable media for predicting the site location of a network device to be tested. A system, according to one implementation, includes a processing device and a memory device. The memory device is configured to store a computer program having instructions that, when executed, enable the processing device to obtain packet transmission characteristics related to packets transmitted between an unknown network device and a plurality of beacon devices. Each beacon device is a network device associated with a fixed site location within a multi-site network. Furthermore, the instructions are also configured to enable the processing device to utilize the packet transmission characteristics to predict a site within the multi-site network where the unknown network device is located.

In some implementations, the instructions may further be configured to enable the processing device to use an unsupervised machine learning process to detect the fixed site location of each of the beacon devices. The processing device may use the unsupervised machine learning process to detect latency patterns between each pair of beacon devices. The processing device may detect the latency patterns using one or more of a ping process and a traceroute process, such as to determine vectors of a distance matrix. The instructions may further be configured to enable the processing device to detect the fixed site locations using a clustering technique. The clustering technique, for instance, may include one or more of a k-means clustering process, an agglomerative clustering process, a Density-Based Spatial Clustering of Applications with Noise (DBSCAN) clustering process, and/or other suitable techniques. The processing device may use the detected fixed site locations as labels for training a supervised machine learning process and to predict the site by using the supervised machine learning process.

According to some implementations, the unknown network device may be a firewall device, a switch, a router, a wireless connector, or other suitable type of device. The system may be part of an inventory system for determining the location of a plurality of unknown network devices at a plurality of sites within the multi-site network using an inference technique. The unknown network devices, for example, may be provided by multiple different vendors.

Furthermore, the packet transmission characteristics described above may include one or more of a packet drop characteristic, a latency characteristic, and a hop count of the packets transmitted between the unknown network device and the plurality of beacon devices. The latency characteristic may include one or more of a minimum latency characteristic, a maximum latency characteristic, and a standard deviation characteristic. In some embodiments, the system may further comprise a network interface that is configured to receive the packet transmission characteristics over a plurality of days and at multiple times during each day. The packet transmission characteristics may include location information, latency information, day information, and time-of-day information. The instructions may further be configured to enable the processing device to predict the site where the unknown network device is located using distance-based information and without using Global Positioning System (GPS) information.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 6 is a normalized confusion matrix illustrating true labels versus predicted labels of supervised machine learning data, according to some examples.

FIG. 7 is a graph illustrating a Receiver Operating Characteristic (ROC) curve for showing performance of the present techniques for locating network devices at different sites, according to some examples.

FIG. 10 is a table illustrating a latency-based correlation between devices in a network, according to some examples.

FIG. 11 is a flow diagram illustrating a process for determining the site locations of unknown network devices in a multi-site network, according to various embodiments of the present disclosure.

DETAILED DESCRIPTION

The present disclosure relates to systems and methods for automatically identifying the geolocation of a network device within a multi-site network. For example, the geolocation may be associated with a fixed site location where one or more network devices may be deployed in the network. The systems and methods are configured to leverage machine learning techniques to determine the fixed site location of each of a number of "beacon" devices, which are configured as known devices within the network having a recognized or set location. In some embodiments, the systems and methods of the present disclosure may be configured to utilize a clustering process for detecting and creating a cluster of network devices at each site location of the network.

A first process is used to establish the site locations of the beacon devices. In one embodiment, a two-step method may include automatically detecting the geolocation of a number of network devices using supervised and unsupervised machine learning to recognize latency patterns between these network devices across the network. In this way, it is possible to create a short list of "beacons" (e.g., network devices with known locations). Unlike some conventional methods that try to predict the Global Positioning System (GPS) coordinates of network devices (with mixed results), the present disclosure provides embodiments that are configured to predict the site where the network devices belong, such as be determining the site location of the network devices.

The systems and methods described in the present disclosure have been tested. As a result of this testing, it has been determined that the present embodiments provide a great improvement over conventional systems. A Proof of Concept (PoC) validation of the present embodiments was performed to test the accuracy using actual real-world measurements in a production network. The results showed that in a real-world environment, the embodiments of the present disclosure were able to perfectly discover (with 100% accuracy) the location of all network devices that were tested, including the location of devices at sites only a few miles apart (e.g., San Jose versus Milpitas site locations) and groups of sites (e.g., Montreal/Quebec/Ottawa sites, Pune/Mumbai sites).

Figure 1:
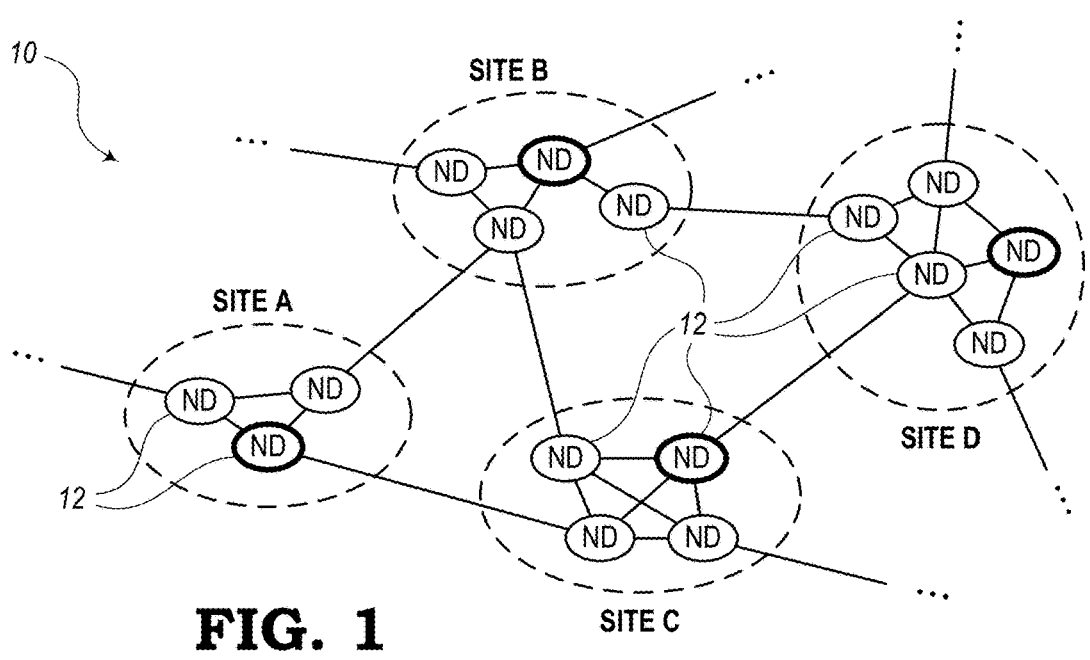
FIG. 1 is a diagram illustrating a communication network, according to various embodiments.

FIG. 1 is a diagram illustrating an example of a communication network 10 shown for showing the various implementations of the present disclosure. In this example, the communication network 10 includes a number of sites (e.g., Site A, Site B, Site C, and Site D). It should be noted that other communication networks, according to other examples, may include any number of sites or site locations arranged in any suitable configuration. Also, communication network 10 includes one or more network devices (NDs) 12 located at each site having any number of internal connections or links suitable for enabling communication within the site itself as well as any number of external connections or links suitable for enabling communication from one site to another. The NDs 12 may also be arranged in any suitable manner, depending on the particular topology of the communication network 10.

According to some embodiments, the sites within communication network 10 may include a group (e.g., cluster) of NDs 12 having similar location properties. For example, when network latency characteristics are detected between any two NDs within the communication network 10, it would be understood that there will normally be less latency between two NDs located at the same site, as compared with, for example, the latency properties between an ND 12 at Site A and an ND 12 at Site D. The present disclosure is configured to take advantage of this latency information, which may be also associated with distance-based parameters between the two NDs, to determine where an unknown ND 12 (e.g., a new network device, a re-connected network device, etc.) is located within the communication network 10. More specifically, by comparing an unknown ND 12 with a number of known "beacon" devices (e.g., NDs 12 of which location information or site information is known), the systems and methods of the present disclosure are configured to determine where each unknown ND 12 belongs (e.g., at which site each unknown ND 12 is located). According to one implementation, the NDs 12 that are highlighted in FIG. 1 may be configured as the beacon devices to which the other NDs 12 can be compared.

Figure 2:
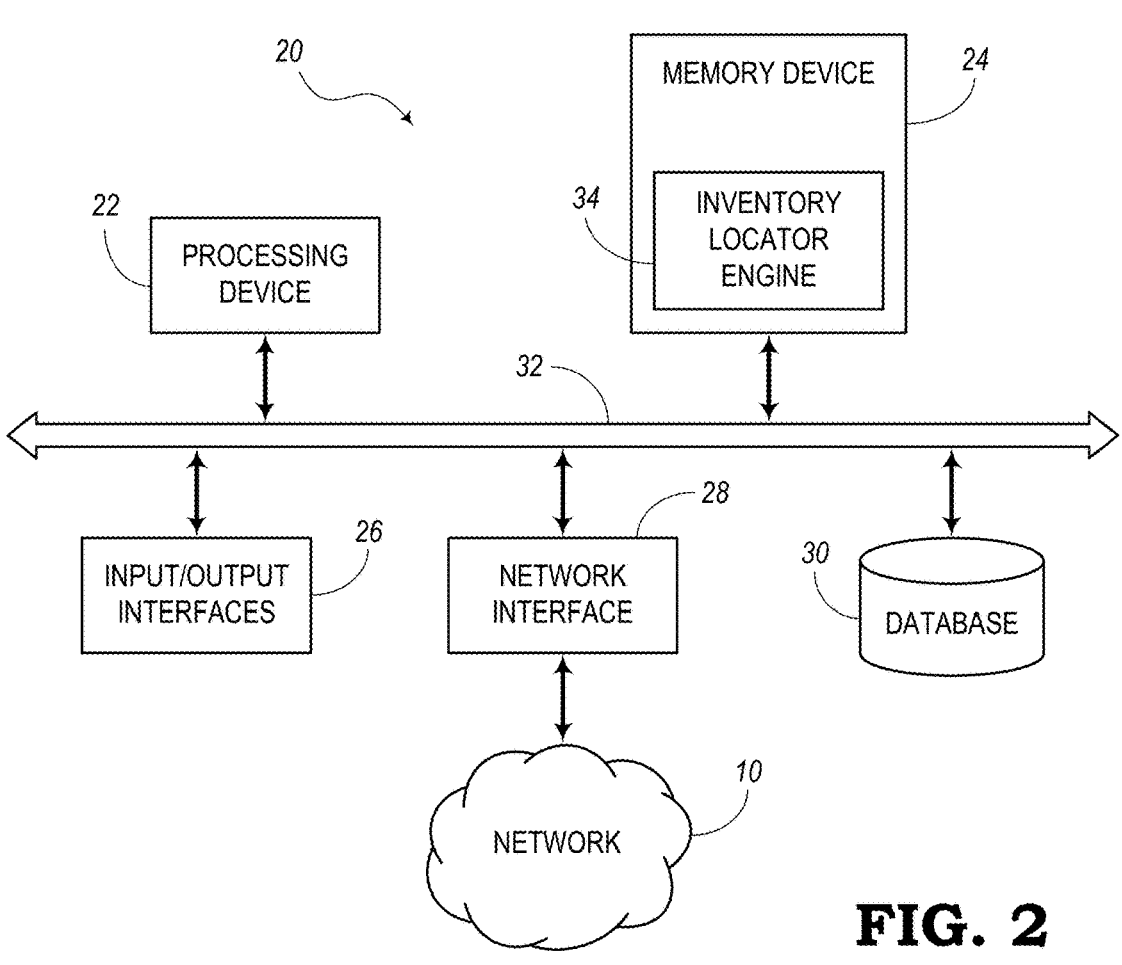
FIG. 2 is a block diagram illustrating a management system for determining the location of a plurality of devices of a network at a number of network sites, according to various embodiments of the present disclosure.

FIG. 2 is a block diagram illustrating an embodiment of a management system 20 for determining the location of the plurality of NDs 12 a network (e.g., the communication network 10 of FIG. 1). More particularly, the management system 20 is configured to determine the location of the NDs 12 may be determining a specific site (e.g., Site A, Site B, Site C, Site D, etc.) where the NDs 12 are arranged or located.

In the illustrated embodiment, the management system 20 may be a digital computing device that generally includes a processing device 22, a memory device 24, Input/Output (I/O) interfaces 26, a network interface 28, and a database 30. It should be appreciated that FIG. 2 depicts the management system 20 in a simplified manner, where some embodiments may include additional components and suitably configured processing logic to support known or conventional operating features. The components (i.e., 22, 24, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 26, 28, 30.

It should be appreciated that the processing device 22, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 22 may also include or utilize stored program instructions (e.g., stored in hardware, software, and/or firmware) for control of the management system 20 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 24 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 24 may incorporate electronic, magnetic, optical, and/or other types of storage media. The memory device 24 may have a distributed architecture, where various components are situated remotely from one another, but can be accessed by the processing device 22.

The memory device 24 may include a data store, database (e.g., database 30), or the like, for storing data. In one example, the data store may be located internal to the management system 20 and may include, for example, an internal hard drive connected to the local interface 32 in the management system 20. Additionally, in another embodiment, the data store may be located external to the management system 20 and may include, for example, an external hard drive connected to the Input/Output (I/O) interfaces 26 (e.g., SCSI or USB connection). In a further embodiment, the data store may be connected to the management system 20 through a network and may include, for example, a network attached file server.

Software stored in the memory device 24 may include one or more programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 22), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 22 or other suitable circuitry or logic). For example, when executed, the instructions may cause or enable the processing device 22 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., the processing device 22), or any suitable combination thereof. Software/firmware modules may reside in the memory device 24, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 26 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 28 may be used to enable the management system 20 to communicate over a network, such as the network 10, the Internet, a Wide Area Network (WAN), a Local Area Network (LAN), and the like. The network interface 28 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 28 may include address, control, and/or data connections to enable appropriate communications on the network 10.

The management system 20 may be configured as or may be part of an inventory system for maintaining inventory information about the NDs 12 within the communication network 10. The database 30 may be configured to store the inventory information of each of the NDs 12 and the location information with respect to which site each ND 12 is located.

According to various embodiments of the present disclosure, the management system 20 may further include an inventory locator engine 34. As shown, the inventory locator engine 34 may be configured as software and/or firmware and stored in the memory device 24. In other embodiments, the inventory locator engine 34 may be implemented, at least partially, as hardware in the processing device 22. The inventory locator engine 34 is configured to enable the processing device 22 to perform various functions in order to determine the location and/or site location of each of the NDs 12.

In some embodiments, the inventory locator engine 34 may be configured to perform to main procedures. A first procedure includes using unsupervised machine learning to establish a relatively small number of NDs 12 as "beacon" devices to which the remaining NDs 12 can be compared for detecting site location information. This first procedure may also be performed to train a supervised machine learning model that can be used for the second procedure. The second procedure includes using the supervised machine learning model to test one or more unknown NDs 12 to determine the location (or site) of the unknown NDs 12. Testing the unknown NDs 12 may include processes for comparing them to the beacon devices to detect distance-based and/or latency-based information.

Therefore, the present disclosure provides systems (e.g., management systems, inventory systems, etc.), methods (e.g., inventory location methods, site locating methods, etc.), and non-transitory computer-readable media (e.g., stored in the memory device 24) for determining the site location of each of a number of network devices (e.g., NDs 12) within a distributed network. For example, a system, according to one implementation, may include a processing device (e.g., processing device 22) and a memory device (e.g., memory device 24) configured to store a computer program (e.g., inventory locator engine 34) having instructions that, when executed, enable the processing device to perform a number of location-detecting processes for determining the location of one or more NDs 12. For example, in one embodiment, the processing device may be configured to obtain packet transmission characteristics related to packets transmitted between an unknown network device and a plurality of beacon devices. Each beacon device may be a network device associated with a fixed site location within a multi-site network (e.g., communication network 10). The processing device may further be configured to utilize the packet transmission characteristics to predict a site within the multi-site network where the unknown network device is located.

The instructions may further be configured to enable the processing device to use an unsupervised machine learning process to detect the fixed site location of each of the beacon devices. The processing device may use the unsupervised machine learning process to detect latency patterns between each pair of beacon devices. The processing device may also be configured to detect the latency patterns using one or more of a ping process and a traceroute process to determine vectors of a distance matrix. The instructions may further be configured to enable the processing device to detect the fixed site locations using a clustering technique. The clustering technique, for example, may include one or more of a k-means clustering process, an agglomerative clustering process, and a Density-Based Spatial Clustering of Applications with Noise (DBSCAN) clustering process. The processing device may use the detected fixed site locations as labels for training a supervised machine learning process. The processing device may then be configured to predict the site by using the supervised machine learning process.

In addition, the systems described above may further be configured, whereby each of the unknown network devices may be a firewall device, a switch, a router, a wireless connector, or other suitable device. In some embodiments, the system may be part of an inventory system for determining the location of a plurality of unknown network devices at a plurality of sites within the multi-site network and may determine site locations using an inference technique. It may further be noted that the unknown network devices may be provided by multiple different vendors.

Also, the packet transmission characteristics described above may include one or more of a packet drop characteristic, a latency characteristic, and a hop count of the packets transmitted between the unknown network device and the plurality of beacon devices. For example, the latency characteristic may include one or more of a minimum latency characteristic, a maximum latency characteristic, and a standard deviation characteristic. This system may also include a network interface (e.g., network interface 28), which may be configured to receive the packet transmission characteristics over a plurality of days and at multiple times during each day. The packet transmission characteristics may include location information, latency information, day information, and time-of-day information. Furthermore, the instructions of the inventory locator engine 34 may be configured to enable the processing device to predict the site where the unknown network device is located by using distance-based information. Also, the site may be predicted without using Global Positioning System (GPS) information.

According to some embodiments of the present disclosure, the systems may be configured to execute a process that involves two procedures. The first procedure includes an unsupervised machine learning technique for detecting the beacons. For example, the first procedure may include collecting network data (e.g., packet transmission parameters) using any suitable method, such as a ping procedure, a traceroute procedure, etc. Then, the first procedure may also include pre-processing the collected network data to build feature vectors (e.g., to create a distance-based matrix), and then predicting the location or geolocation of the beacons. Based on the location information, the present systems may be configured to train a supervised machine learning model. For example, in the first procedure, the inventory locator engine 34 may be configured to allow the processing device 22 to use unsupervised distance-based clustering to detect the sites of a network (e.g., communication network 10). This procedure can be performed with excellent accuracy.

The second procedure, according to various embodiments, may use a supervised machine learning technique, which may be learned during the first procedure, for determining the location of the network devices with respect to the beacons. The second procedure may include collecting network data (e.g., packet transmission parameters) of the network devices to be tested. This network data may include, for example, data, network statistics, Performance Metrics (PMs), etc. from the transmission characteristics of packets transmitted between the tested network devices and the beacons. These characteristics may be obtained using a ping process, traceroute process, etc. Then, the second procedure includes predicting the site of each of the tested network devices using the trained machine learning model and the network data/stats. Also, this step of the second procedure may further include an inference engine used for detecting or predicting the site locations.

Thus, the present systems may be configured to build a network of known devices (e.g., beacons) and their corresponding positions, which can be used as an aid for a clustering procedure. In this way, it is possible to recognize hidden patterns mutually shared by the network. The systems can leverage information from network service utilities, such as ping, traceroute, etc.

The similarly shared network and tools can be used to get the appropriate information for unidentified network devices. Formed network patterns can be matched with existing network patterns, and the closest match can be considered to be the network device's position. Again, the present processes provide excellent accuracy and allows the system to reliably and significantly reduce (and be integrated in) more complex automation workflows. The present system may be configured to leverage simple networking utility tools, which can be quickly and remotely accessible. As a result, no travel to the different sites and/or measurements using GPS receivers/tools is required, which may be an improvement with respect to conventional systems.

Figures 3, 4:
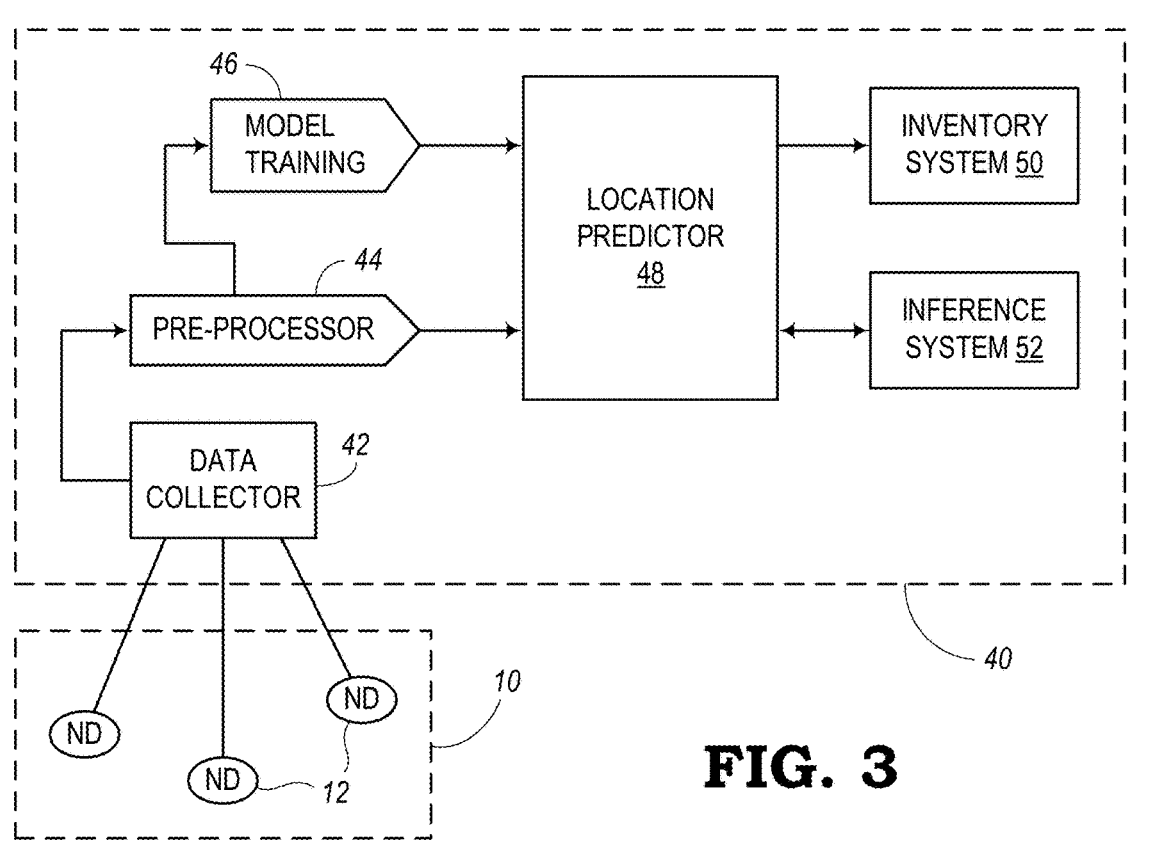
FIG. 3 is a block diagram illustrating a device locating system, according to various embodiments of the present disclosure.
FIG. 4 is a confusion matrix illustrating true labels versus predicted labels of unsupervised clustering, according to some examples.

FIG. 3 is a block diagram illustrating an embodiment of a device locating system 40. In this embodiment, the device locating system 40 may include some features and functionality that is similar to the management system 20 of FIG. 2. The device locating system 40 may be implemented in any suitable combination of hardware, software, and/or firmware and may be executed by one or more processors (e.g., processing device 22).

The components of the device locating system 40 include a data collector 42, which is arranged in communication with one or more of the Network Devices (NDs) 12 of the communication network 10 and/or may be configured to obtain network packet transmission characteristics from any other suitable network devices, network elements, etc. of any suitable network. In some embodiments, the NDs 12 may be switches, routers, multiplexers, wireless connection elements, firewall components, etc., arranged at one or more recognizable sites within a multi-site network. The data collector 42 is connected with the devices in the network and is configured to trigger commands and collect all the latency related data (e.g., ping data, trace-route data, etc.).

The device locating system 40 also includes a pre-processor 44 or other suitable pre-processing component responsible for converting and extracting latency data sets (e.g., time-series points). This data may be indicative of a good measure of the physical distance between the various network devices (NDs). Since latency can result from both physical distance between devices and congestion in a network, the pre-processor 44 may be configured to calculate average latency metrics over several days and extract minimum values observed in this duration. In some cases, it may be less likely that the minimum value of the latency (measured over several days) would be influenced by network congestion.

Also, the device locating system 40 of FIG. 3 may also include a model training component 46 for training a machine learning model from the collected data and pre-processed data from the data collector 42 and pre-processor 44. A location predictor 48 may be configured to use the pre-processed data and a supervised machine learning model (i.e., from the model training component 46). The device locating system 40 also includes an inference system 52 configured to assist the location predictor 48 to predict locations of unknown NDs using the collected network transmission data and trained model. The inference system 52 may be an inference engine or a service device that allows the location predictor 48 to receive a set of latency values as input and provide an output of a model prediction for the various locations.

In some embodiments, the location predictor 48 may be configured to interact with the pre-processor 44, model training component 46, and the inference system 52 to perform location estimations for a given set of latency values for each ND whose location is originally unknown. The location predictor 48 then interfaces with an inventory system 50 to pass the estimated location information. The inventory system 50 may be responsible for maintaining the inventory information for all the managed network devices in the network.

As mentioned above, the systems and methods of the present disclosure may be configured to execute a two-step procedure for performing the location-detection functionality in the various embodiments herein. The two procedures include 1) Beacon Site Discovery and 2) Site Location Detection of New Devices.

Step 1: Beacon Site Discovery

To bootstrap step 2 (described below), the systems of the present disclosure are configured to use unsupervised machine learning to automatically discover the sites and/or locations of a relatively small number of NDs (e.g., n devices). These n devices may then act as "beacons" to aid the algorithms of step 2.

Step 1 includes (a) collecting various network statistics from the n devices using network service utilities/procedures, such as ping, traceroute, etc. It may be understood by one of ordinary skill in the art that when two devices are connected directly to each other, they will share a lot of information between them in terms of packets/frames. Hence, the systems of the present disclosure can measure the Performance Metrics (PMs) based on packet transmission information (e.g., packet drop information, latency information, hop count information, etc.) between these n devices. In some embodiments, the present systems may be configured to (b) build an n×n distance matrix by computing a distance function. The distance function may be calculated in a mathematical sense and may not necessarily be directly related to a physical distance. The distance function may be calculated between all pairs of n devices using the PMs or other data from sub-step (a).

The Beacon Site Discovery step may further include (c) using the distance matrix from sub-step (b) and an unsupervised distance-based clustering algorithm to discover the sites. As described below, the systems and methods of the present disclosure are capable of performing this sub-step with nearly perfect accuracy. In this embodiment, it may be noted that clusters may be indicative of network sites (e.g., Site A, Site B, Site C, Site D, etc.) within a multi-site network. The clusters (e.g., sites) may be used as labels during the training of a supervised machine learning model utilized in Step 2.

The trained model, according to various embodiments, may be configured to identify a specific nature of "data clustering" of a machine learning problem. For example, the data clustering processes may include techniques or algorithms such as k-means processing, agglomerative processing, Density-Based Spatial Clustering of Applications with Noise (DBSCAN) processing, and/or other clustering processes.

Regarding a model deployment process, the systems of the present disclosure may be configured to convert models to an Open Neural Network Exchange (ONNX) format and/or other suitable formats. For example, ONNX is an open standard format for representing machine learning models and has been implemented in many frameworks and tools.

FIG. 4 shows a confusion matrix 60 illustrating an example of true labels versus predicted labels of unsupervised clustering. The normalized confusion matrix 60 shows that the unsupervised machine learning approach yields good results despite the fact that labels are not provided while forming clusters. It may also be noted that the present systems may generate the confusion matrix 60 for the unsupervised ML model as the sites (e.g., ground truth) are detected by the management system 20, controllers, network operator devices, Network Management Systems (NMSs), or other Information Technology (IT) systems for managing inventory and/or detecting inventory locations within a network. In this case, the site information as shown in the confusion matrix 60 was not used to train the cluster models.

Step 2: Site Location Detection of New Devices

The second step of the two-step device location procedure may represent a normal operating mode after the beacons have already been established. One of the goals of the second step is to identify the geo-location/site where an unknown device belongs by using a supervised machine learning model (e.g., the model trained by the model training component 46) using PMs, network statistics, packet transmission information, etc. from Step 1.

In Step 2, the same (or similar) components may be used to (a) collect the various network statistics from the unknown device with respect to the n beacon devices. These network statistics may be obtained using network service utilities. From the collected data, the systems may be configured to (b) predict the site of the unknown device using the trained machine learning model, the inference system 52, and the data described above. Thus, according to the steps and sub-steps of this device location procedure, it has been determined that the embodiments of the present disclosure are significantly more robust with respect to noise compared with conventional methods and are significantly more accurate than conventional methods, as demonstrated below.

Model Training

The embodiments of the present disclosure are configured to train a machine learning model using unsupervised data. From a trained supervised machine learning model, the present embodiments are configured to detect the site locations of multiple unknown network devices within the network. The model training technique, according to some embodiments, may include (a) collecting actual network statistics (e.g., using ping, trace-route, etc.) from a production network. In one example, the process may include using numerous devices from 12 sites (e.g., one or more NDs at each site), whereby the sites may be distributed across the globe. The network statistics (e.g., data transmission characteristics, latency characteristics, hop characteristics, etc.) may reveal interesting and useful location traits. Also, the network statistics may be obtained or received at different times of the day over several days. Collecting data over many days allows the system to account for natural fluctuations of latencies (e.g., as per industry standard) as the latency between devices will typically vary if there are network or Internet Service Provider (ISP) issues between sites.

Figure 5:
FIG. 5 is a table illustrating non-normalized sample training data of latency in a network, according to some examples.

FIG. 5 is a table 70 illustrating an example of nonnormalized sample training data of latency in a network. In this example, the table 70 shows raw latency values in milliseconds between a number of network devices and beacons (i.e., labelled "Milpitas," "Pune," etc.). The model training methods may further include (b) creating oversampled values using the real-world data and introducing an additional random noise parameter (e.g., up to +/−10%).

Step (c) of the model training method includes normalizing the raw latency values (in msecs), where the feature space is the set of normalized latency values generated by the network device with respect to other network devices. Step (d) (e.g., an option step) may include considering additional metrics (e.g., a minimum latency value, a maximum latency value, a standard deviation value of the latency, a number of hops, etc.). This dataset may be used to train the supervised machine learning model, as shown with respect to FIG. 5.

FIG. 6 shows an example of a normalized confusion matrix 80 illustrating true labels versus predicted labels of supervised machine learning data. This normalized confusion matrix 80 may be used in an evaluation process for evaluating the trained model. This model evaluation technique, which may be compared to the model evaluation described with respect to FIG. 4, may include a nature of a machine learning problem, which in this case may be a multi-class classification. For example, classification processes or algorithms may include Random Forest, XGBoost, and/or other classifier techniques.

A model deployment process may follow. For example, the technique may include converting models to ONNX format (as described above). Also, evaluation metrics may be considered, such as classification reports, confusion matrices, Receiver Operating Characteristic (ROC) curves (as described with respect to FIG. 7 below), Area Under the Curve (AUC) evaluations, ROC-AUC curves, Precision-Recall (P-R) curves, F1 scores, etc.

FIG. 7 is a graph 90 illustrating a Receiver Operating Characteristic (ROC) curve for showing performance of the present techniques for locating network devices at different sites, according to some examples. It should be noted that the graph 90 of FIG. 7 illustrates that the machine learning approach of the present disclosure is able to classify every network device perfectly with zero false positives (i.e., 100% accuracy). The True Positive Rate (TPR) versus False Positive Rate (FPR) (TPR-FPR) plot of graph 90 shows a perfect Area Under Curve (AUC) of 1.0 for a fully shuffled dataset. The ROC-AUC of the graph 90 of FIG. 7 shows how well the present model is able to perform, regardless of the heavily varied training dataset that is used.

Figure 8:
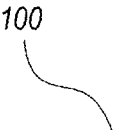
FIG. 8 is a table illustrating an evaluation of classification with respect to the present techniques for locating network devise at different sites, according to some examples.

FIG. 8 is an example of a table 100 illustrating an evaluation of classification with respect to the present techniques for locating network devise at different sites. In this example, the table 100 includes an evaluation summary and/or classification report. The classification report is based on a standard 70:30 train-test split showing metrics such as Precision, Recall, and F1 scores. The 100% F1 score shown in the table 100 simply means that the systems and methods of the present disclosure are capable of classifying the devices with 100% accuracy. For example, this may be particularly important for such an automated approach, since the present systems can ensure that no human efforts would be required for updating the inventory systems.

Figure 9:
FIG. 9 is a table illustrating actual distances between devices in a network, according to some examples.
Figure 9:

FIG. 9 is a table 110 illustrating an example actual distances between devices in a network. As suggested above, a Proof of Concept (PoC) experiment (with associated data) may be implemented to validate the various embodiments of the present disclosure. Accuracy was tested using actual real-world measurements from an IT production network. In this experiment, the network devices were provided by multiple different vendors. Also, the different network devices were tested from various locations with different conditions. The table 110 of FIG. 9 highlights the actual distances between the difference devices (or sites).

For example, devices at significantly different physical distances between the respective sites were tested (e.g., between Sydney, Australia and Denver, Colorado, US). In this long-distance case, the distance between sites is greater than 1000 kms. Also, devices separated by a moderate distance between the respective sites were also tested (e.g., between Pune, India and Mumbai, India and between Ottawa, Canada and Montreal, Canada). In this middle-distance case, the distance between the sites is in the range from about 100 kms to about 300 kms. In addition, devices separated by a very short distance (with respect to network topologies) between the respective sites were also tested (e.g., between San Jose, California and Milpitas, California). In this short-distance case, the distance between the sites is less than about 10 kms.

FIG. 10 is a table 120 illustrating of a latency-based correlation between devices in a network according to one example. The table 120, in a sense, may be considered to be a test to check the general functional (e.g., sanity check) and shows the correlation between pairwise latencies for each device (alongside the corresponding site name) with respect to other devices.

As expected, the correlation patterns shared for the latencies and the distances are similar. Thus, the table 120 demonstrates that there is a strong correlation between sites that are moderately distant while showing little or no distinction between sites that are very close. For instance, devices with IP addresses "XX.139.0.1" and "XX.39.3.11" are determined to be from the same location (i.e., Sydney, Australia) and also share the same latency patterns. Similarly, the observations are the same for the devices from other locations, such as devices from Denver, Colorado, US ("XX.168.3.3" and "XX.68.3.11") or devices from Friedrichshafen, Germany ("XX.8.3.251" and "XX.138.3.3").

FIG. 11 is a flow diagram illustrating an embodiment of a process 130 for determining the site locations of unknown network devices in a multi-site network. In this embodiment, the process 130 includes a step of obtaining packet or frame transmission characteristics related to packets or frames transmitted between an unknown network device and a plurality of beacon devices, as indicated in block 132. Each beacon device, for example, is a network device associated with a fixed site location within a multi-site network. The process 130 also includes a step of utilizing the packet or frame transmission characteristics to predict a site within the multi-site network where the unknown network device is located, as indicated in block 134. Note, those skilled in the art will recognize the present disclosure can be used with packets, frames, cells, or any other unit of data that can have its transmission characteristics measured. The terms packets and frames used and claimed herein are meant to cover any type of data.

According to some embodiments, the process 130 may be executed with respect to the inventory locator engine 34 shown in FIG. 2 or may be executed by the various systems described throughout the present disclosure. In some embodiments, the process 130 may be implemented as software or firmware in a non-transitory computer-readable medium and executed by one or more processing devices.

In addition, the process 130 may further include a step of using an unsupervised machine learning process to detect the fixed site location of each of the beacon devices. The unsupervised machine learning process may be used to detect latency patterns between each pair of beacon devices. The process 130 may also be configured to include the step of detecting the latency patterns using one or more of a ping process and a traceroute process to determine vectors of a distance matrix.

In some embodiments, the process 130 may also include detecting the fixed site locations using a clustering technique. For example, the clustering technique may include one or more of a k-means clustering process, an agglomerative clustering process, a Density-Based Spatial Clustering of Applications with Noise (DBSCAN) clustering process, or other suitable clustering technique. Also, the process 130 may include using the detected fixed site locations as labels for training a supervised machine learning process and predicting the site by using the supervised machine learning process.

According to some embodiments, each of a plurality of unknown network devices to be detected may be one of a firewall device, a switch, a router, and a wireless connector. The process 130, in some embodiments, may be configured to be implemented as part of an inventory system for determining the location of a plurality of unknown network devices at a plurality of sites within the multi-site network using an inference technique. Also, the unknown network devices may be devices that are provided by multiple different vendors.

Also, the packet transmission characteristics obtained in bock 132 may include one or more of a packet drop characteristic, a latency characteristic, and a hop count of the packets transmitted between the unknown network device and the plurality of beacon devices. The latency characteristic, for example, may include one or more of a minimum latency characteristic, a maximum latency characteristic, and a standard deviation characteristic.

The process 130, according to various embodiments, may also be configured where a network interface (and/or other suitable components) may be configured to receive the packet transmission characteristics over a plurality of days and at multiple times during each day. The packet transmission characteristics may include location information, latency information, day information, and time-of-day information. The process 130 may also include the step of predicting the site where the unknown network device is located using distance-based information and without using Global Positioning System (GPS) information.

The systems and methods of the present disclosure may demonstrate results that are not normally provided by conventional systems. For example, the present embodiments may include location estimation for unidentified devices leveraging machine learning techniques. As described herein, the systems and methods may include the usage of a latency characteristic as a key metric and may also include unsupervised/supervised machine learning for location estimation. This functionality may be implemented in software/firmware and/or in an API that allows the user to access the system programmatically. The present embodiments are also configured to train models and/or perform clustering type analysis. Thus, the present disclosure may include architecture able to perform data driven location estimation in an automated fashion with a suitable technology stack composition geared towards solving the problems discussed herein or to solve similar problems.

As a result, the present embodiments are able to perfectly predict in real-time the geo-location/site of devices in networks (e.g., enterprise networks) in real-time. This may be done by mapping relevant network statistics to the beacon-based feature space and modelling the unique signature/pattern of each site using network statistics and machine-learning-based distance metrics. Finally, the present embodiments may then predict (with 100% accuracy) the geo-location/site of unknown network devices in networks using these site signatures, a supervised ML model, a distance metric, and live PMs.

Calculation of the signatures and predictions are inherently parallelizable, increasing the scale of the system. The predictions described in the present disclosure can be embedded in closed-loop systems to detect in real-time if a device was moved to a new site and can even trigger any action as needed for close-loop automation. For instance, the present embodiments may perform automatic reconfiguration of the device that was moved, including, for example, reconfiguring DNS, NTP, and/or device credentials. Also, automatic reconfiguration of other devices may be performed for firewalls. Notification to the network operator, security teams, or other management or control personnel may be provided when devices are moved.

The systems and the methods of the present disclosure may therefore have a number of benefits and improvements with respect to conventional solutions. For example, the present embodiments may provide a practical solution for an inventory management system, even by updating existing inventory management systems. The present systems and methods relieve the previous solutions from having to organize the devices manually and can be done in an automatic, stress-free, and efficient way. An end-to-end method may include data collection of the network stats, pre-processing this data to build feature vectors, and then perform the "two-step" procedure described herein. This method can then predict the geolocation of unknown devices, from site discovery to the localization of new devices. The methods can be used to automatically discover existing sites (e.g., brown field type deployments) and new sites (e.g., green field type deployments).

The methods can be used to automatically update geolocation information in inventory systems. Also, the methods are able to offer 100% accuracy to predict which site a device belongs to. This simply means that the present systems and methods are configured to avoid any type of misclassification of the device's geo-location. By automating the processes, the present disclosure is able to minimize human efforts normally required for updating a network inventory system. In some cases, the site locating processes may be embedded in more complex automation workflows.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
a processing device, and
a memory device configured to store a computer program having instructions that, when executed, enable the processing device to
obtain transmission characteristics related to any of packets and frames transmitted between an unknown network device and a plurality of beacon devices, wherein each beacon device is a network device located at a fixed site within a multi-site network,
use transmission characteristics collected between each pair of the plurality of beacon devices over multiple days to extract minimum-latency values and construct an n×n distance matrix having distance-based values representing beacon-to-beacon latency patterns,
use an unsupervised machine learning process operating on the n×n distance matrix to detect the fixed site of each of the beacon devices and use the detected fixed sites as labels for training a supervised machine learning process, wherein the unsupervised machine learning process comprises identifying patterns in the transmission characteristics to group beacon devices by site based on beacon-to-beacon latency patterns that characterize site-specific network signatures, without requiring initial geographic site labeling, thereby enabling automatic determination of beacon device locations for supervised training,
utilize the transmission characteristics between the unknown network device and the plurality of beacon devices to generate a latency-based feature vector mapped into a site-signature feature space learned from the detected beacon sites, and utilize the transmission characteristics with the supervised machine learning process to predict a site within the multi-site network where the unknown network device is located, wherein the fixed site and the site each correspond to a geographic location in the multi-site network where one or more network devices are located, and
utilize the site where the unknown network device is located to (1) update an inventory system and (2) perform automatic reconfiguration of the unknown network device based on the site, wherein the automatic reconfiguration comprises automatically applying configuration settings specific to the predicted geographic location, including at least one of security parameters, network access restrictions, or quality of service parameters, based on site-specific policies associated with the predicted geographic location.

2. The system of claim 1, wherein the instructions are further configured to enable the processing device to use the unsupervised machine learning process to detect latency patterns between each pair of beacon devices.

3. The system of claim 2, wherein the instructions are further configured to enable the processing device to detect the latency patterns using one or more of a ping process and a traceroute process to determine vectors of a distance matrix.

4. The system of claim 1, wherein the instructions are further configured to enable the processing device to detect the fixed site using a clustering technique.

5. The system of claim 4, wherein the clustering technique includes one or more of a k-means clustering process, an agglomerative clustering process, and a Density-Based Spatial Clustering of Applications with Noise (DBSCAN) clustering process.

6. The system of claim 1, wherein the unknown network device is one of a firewall device, a switch, a router, and a wireless connector.

7. The system of claim 1, wherein the system is part of the inventory system for determining the location of a plurality of unknown network devices at a plurality of sites within the multi-site network using an inference technique.

8. The system of claim 7, wherein the unknown network devices are provided by multiple vendors.

9. The system of claim 1, wherein the transmission characteristics include one or more of a packet drop characteristic, a latency characteristic, and a hop count of the packets transmitted between the unknown network device and the plurality of beacon devices.

10. The system of claim 9, wherein the latency characteristic includes one or more of a minimum latency characteristic, a maximum latency characteristic, and a standard deviation characteristic.

11. The system of claim 1, further comprising a network interface configured to receive the transmission characteristics over a plurality of days and at multiple times during each day, and wherein the transmission characteristics include location information, latency information, day information, and time-of-day information.

12. The system of claim 1, wherein the instructions are further configured to enable the processing device to predict the site where the unknown network device is located using distance-based information and without using Global Positioning System (GPS) information.

13. A non-transitory computer-readable medium configured to store computer logic having instructions that, when executed, cause one or more processing devices to:
 obtain transmission characteristics related to any of packets and frames transmitted between an unknown network device and a plurality of beacon devices, wherein each beacon device is a network device located at a fixed site within a multi-site network,
 use transmission characteristics collected between each pair of the plurality of beacon devices over multiple days to extract minimum-latency values and construct an n×n distance matrix having distance-based values representing beacon-to-beacon latency patterns,
 use an unsupervised machine learning process operating on the n×n distance matrix to detect the fixed site of each of the beacon devices and use the detected fixed sites as labels for training a supervised machine learning process, wherein the unsupervised machine learning process comprises identifying patterns in the transmission characteristics to group beacon devices by site based on beacon-to-beacon latency patterns that characterize site-specific network signatures, without requiring initial geographic site labeling, thereby enabling automatic determination of beacon device locations for supervised training,
 utilize the transmission characteristics between the unknown network device and the plurality of beacon devices to generate a latency-based feature vector mapped into a site-signature feature space learned from the detected beacon sites, and utilize the transmission characteristics with the supervised machine learning process to predict a site within the multi-site network where the unknown network device is located, wherein the fixed site and the site each correspond to a geographic location in the multi-site network where one or more network devices are located, and
 utilize the site where the unknown network device is located to (1) update an inventory system and (2) perform automatic reconfiguration of the unknown network device based on the site, wherein the automatic reconfiguration comprises automatically applying configuration settings specific to the predicted geographic location, including at least one of security parameters, network access restrictions, or quality of service parameters, based on site-specific policies associated with the predicted geographic location.

14. The non-transitory computer-readable medium of claim 13, wherein the instructions are further configured to cause the one or more processing devices to:
 use the unsupervised machine learning process to detect latency patterns between each pair of beacon devices, and
 detect the latency patterns using one or more of a ping process and a traceroute process to determine vectors of a distance matrix.

15. The non-transitory computer-readable medium of claim 13, wherein the instructions are further configured to cause the one or more processing devices to:
 detect the fixed site using a clustering technique, wherein the clustering technique includes one or more of a k-means clustering process, an agglomerative clustering process, and a Density-Based Spatial Clustering of Applications with Noise (DBSCAN) clustering process.

16. A method comprising the steps of:
 obtaining transmission characteristics related to any of packets and frames transmitted between an unknown network device and a plurality of beacon devices, wherein each beacon device is a network device located at a fixed site within a multi-site network,
 using transmission characteristics collected between each pair of the plurality of beacon devices over multiple days to extract minimum-latency values and construct an n×n distance matrix having distance-based values representing beacon-to-beacon latency patterns,
 using an unsupervised machine learning process operating on the n×n distance matrix to detect the fixed site of each of the beacon devices and using the detected fixed sites as labels for training a supervised machine learning process, wherein the unsupervised machine learning process comprises identifying patterns in the transmission characteristics to group beacon devices by site based on beacon-to-beacon latency patterns that characterize site-specific network signatures without requiring initial geographic site labeling, thereby enabling automatic determination of beacon device locations for supervised training, utilizing the transmission characteristics between the unknown network device and the plurality of beacon devices to generate a latency-based feature vector mapped into a site-signature feature space learned from the detected beacon sites, and utilizing the transmission characteristics with the supervised machine learning process to predict a site within the multi-site network where the unknown network device is located, wherein the fixed site and the site each correspond to a geographic location in the multi-site network where one or more network devices are located, and utilizing the site where the unknown network device is located to (1) update an inventory system and (2) perform automatic reconfiguration of the unknown network device based on the site, wherein the automatic reconfiguration comprises automatically applying configuration settings specific to the predicted geographic location, including at least one of security parameters, network access restrictions, or quality of service parameters, based on site-specific policies associated with the predicted geographic location.

17. The system of claim 1, wherein the instructions are further configured to enable the processing device to detect that a network device has been moved.

18. The system of claim 17, wherein the instructions are further configured to enable the processing device to automatically reconfigure the network device based on a new site.

19. The system of claim 17, wherein the instructions are further configured to enable the processing device to provide a notification of the network device including a new site.

* * * * *